W. PECHY 2,729,329

COLLAR BAND DETECTING MACHINE
WITH DETECTOR LOCKING FEATURE

Filed Nov. 20, 1951

INVENTOR.
WILLIAM PECHY
BY Charles H. Lane
Leland R. McCann
George W. Reiber
ATTORNEYS

Jan. 3, 1956 W. PECHY 2,729,329
COLLAR BAND DETECTING MACHINE
WITH DETECTOR LOCKING FEATURE
Filed Nov. 20, 1951 9 Sheets-Sheet 8

INVENTOR.
WILLIAM PECHY
BY Charles H. Erne
Leland R. McCann
George W. Reiber
ATTORNEYS Jan. 3, 1956

W. PECHY 2,729,329

COLLAR BAND DETECTING MACHINE
WITH DETECTOR LOCKING FEATURE

Filed Nov. 20, 1951

INVENTOR.
WILLIAM PECHY
BY Charles H. Lane
Leland R. McCann
George W. Reiber
ATTORNEYS

United States Patent Office 2,729,329
Patented Jan. 3, 1956

2,729,329

COLLAR BAND DETECTING MACHINE WITH DETECTOR LOCKING FEATURE

William Pechy, Belmar, N. J., assignor to American Can Company, New York, N. Y., a corporation of New Jersey Application November 20, 1951, Serial No. 257,303

8 Claims. (Cl. 209—89)

The present invention relates to a machine for detecting collars in tearing strip cans or containers and has particular reference to detecting devices having a novel locking feature for sorting cans with properly located collars from cans with mislocated or missing collars.

In sheet metal cans used for coffee, vegetable shortening and many other products, the opening of the can is usually effected by the removal of a tearing strip formed in the can body adjacent its top end. Removal of the tearing strip releases the entire top end of the can so that access may be had to the interior of the can. An interior collar or collar band is provided in cans of this character in back of the tearing strip to maintain the height of the can and to form a seat for the released top end of the can so that the latter may be replaced on the can and thus used as a reclosure cover. The collar band preferably is made as a separate piece and is assembled with the can body usually by beading by automatic machinery.

Occasionally the collar band is inadvertently omitted from a can or is inserted incorrectly. Such a can causes serious trouble during the following operations of filling and sealing by the packer and opening by the consumer and therefore it is desirable to detect and discard such a can before it is filled.

It is therefore an object of the instant invention to provide a machine which detects the omission or mislocation of collar bands in tearing strip cans, wherein the cans pass through the machine in a continuous procession and are tested for their collars and sorted as to cans with properly located collars and cans without or with mislocated collars so that only the properly collared cans will be filled and sealed.

Another object is the provision of such a testing machine wherein collar detecting heads, insertable into the cans and having novel locking features, are utilized to detect the omission or incorrect location of collars in the cans and to discard such cans while retaining cans with properly located collars for further advancement and subsequent filling and sealing.

Numerous other objects and advantages of the invention will be apparent as it is better understood from the following description, which, taken in connection with the accompanying drawings, discloses a preferred embodiment thereof.

Referring to the drawings.

Figures 6, 7, 8, 9:
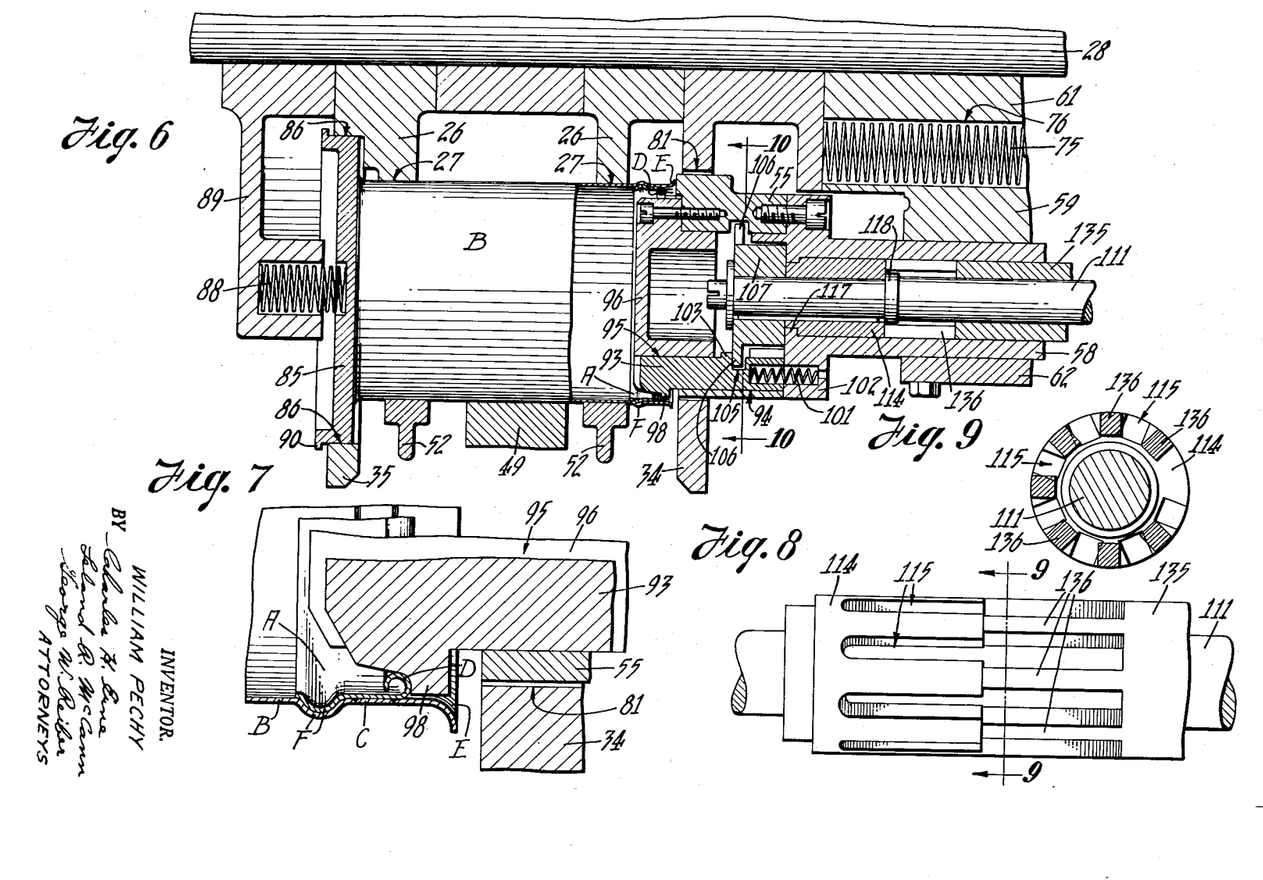
Fig. 6 is an enlarged sectional view of a portion of the machine including a collar detecting unit and a properly collared can, parts being broken away.
Fig. 7 is an enlarged schematic sectional view of a portion of the detecting unit in detecting position relative to a properly placed collar in a can.
Fig. 8 is an enlarged elevational view of a splined and grooved portion of the detecting unit shown at the lower right in Fig. 6.
Fig. 9 is a transverse sectional view taken substantially along the line 9—9 in Fig. 8.

As a preferred or exemplary embodiment of the instant invention the drawings disclose a machine for detecting the omission and/or mislocation of sheet metal collar bands A (Figs. 6 and 7) in sheet metal cylindrical tearing strip cans B. The cans B are closed at their bottom ends with sheet metal bottoms secured in place by suitable seams. The opposite ends of the cans are open and adjacent these open ends the cans are provided with encircling removable tearing strips C. A collar band A fits snugly within a can B adjacent its tearing strip C, and is provided with an inwardly curled edge D located in the can a predetermined distance from the outer edge or flange E of the open end of the can as best shown in Fig. 7. The band A is secured in the can against displacement by nesting or coinciding outwardly projecting beads F formed in the band and in the can.

Figure 1:
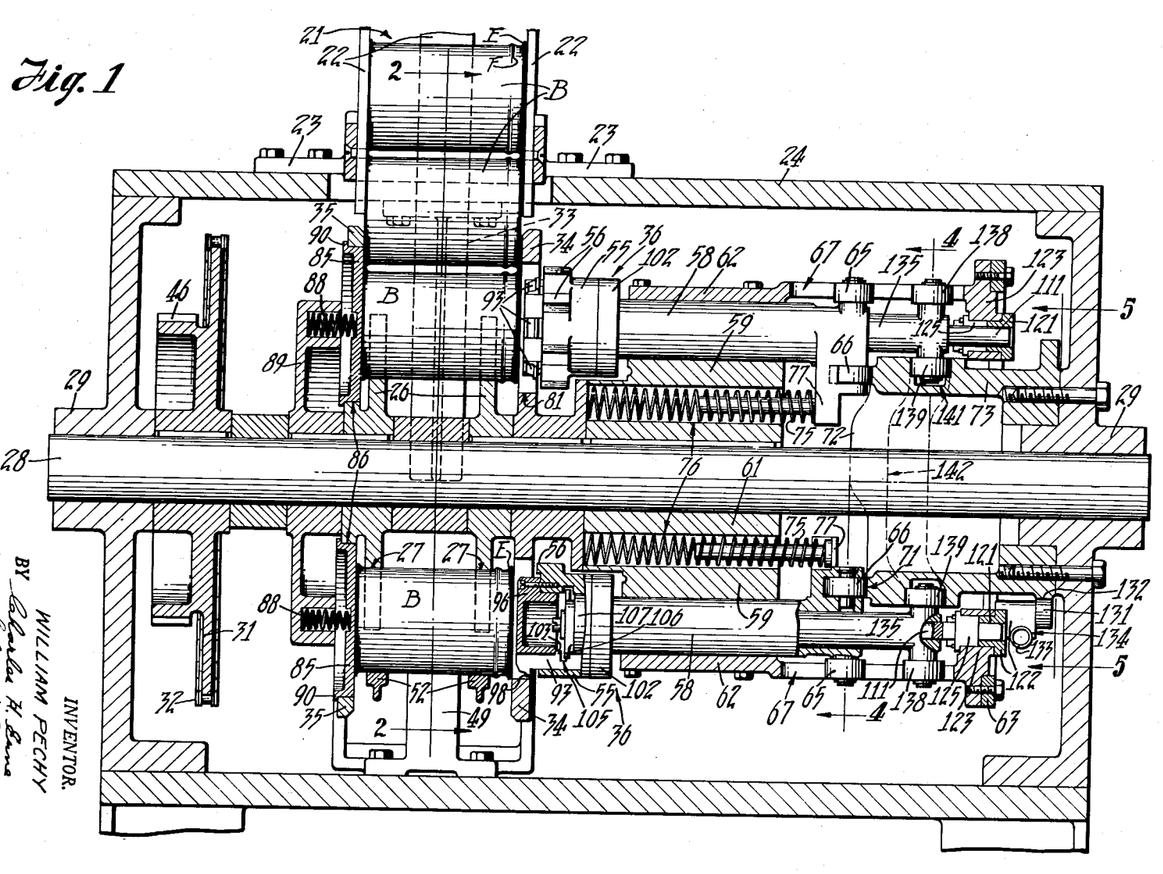
Figure 1 is a transverse vertical sectional view of a testing machine embodying the instant invention, with parts broken away.
Figure 2:
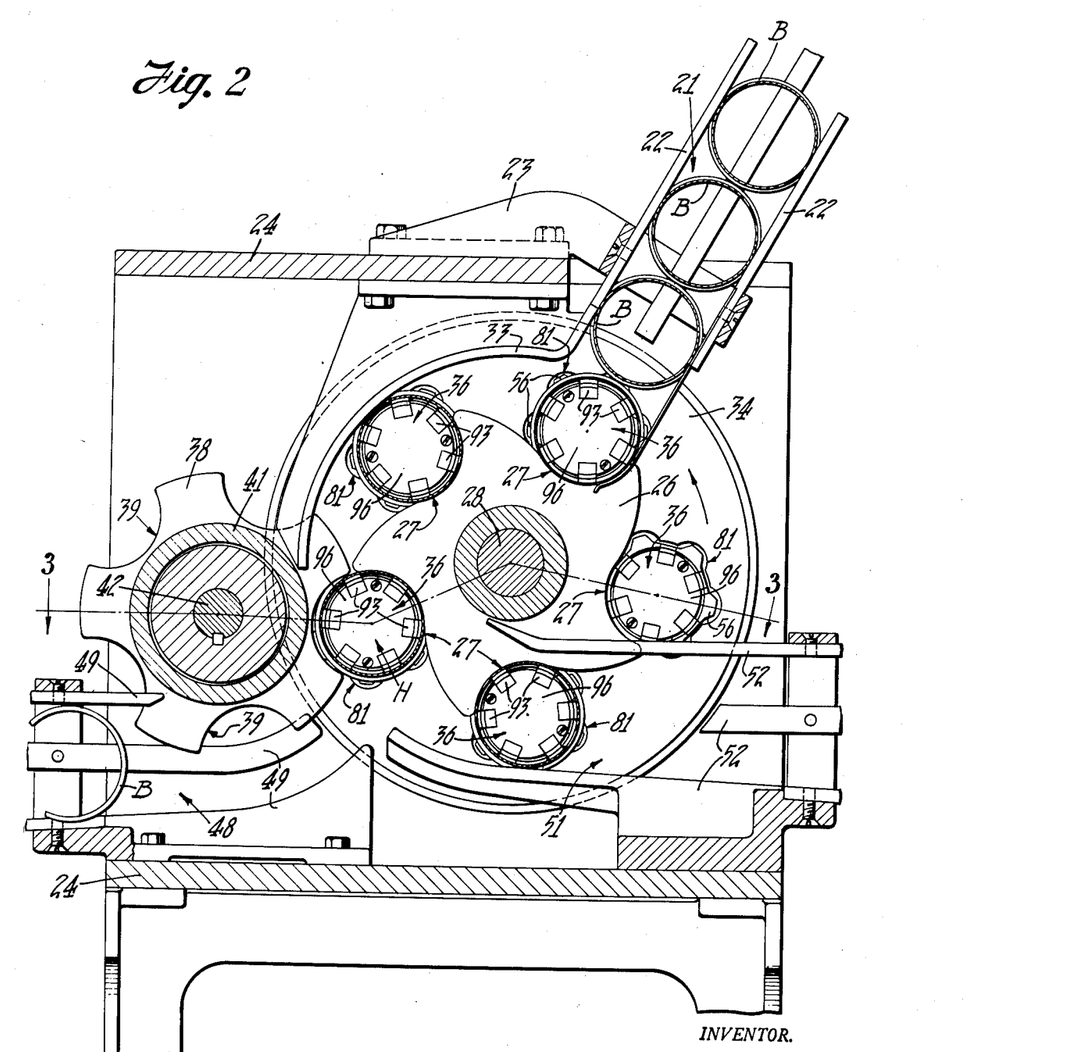
Fig. 2 is a longitudinal vertical section of the machine shown in Fig. 1 as taken substantially along the line 2—2 in that figure, with parts broken away.

The cans B to be tested for the omission and/or proper location or mislocation of their collar bands A, enter the machine from any suitable source of supply, in a substantially continuous procession rolling on their sides along an inclined entrance chute 21 (Figs. 1 and 2). The chute 21 comprises a plurality of spaced and parallel guide rails 22 secured to brackets 23 carried on a frame 24 which consitutes the main frame of the machine.

At the lower end of the entrance chute 21 the cans B are picked off individually and are advanced along a curved path of travel by a pair of spaced and parallel vertically disposed feeding turrets 26 having spaced and transversely aligned can receiving and propelling pockets 27 formed in their outer peripheries. The turrets 26 are mounted on a rotatable main drive shaft 28 journaled at its ends in bearings 29 formed in the main frame 24. The main shaft 28 is continuously rotated, preferably by a sprocket 31 carried on the shaft and operated by an endless chain 32 (see also Fig. 3) driven in any suitable manner.

During the first portion of the curved path of travel of the cans B in the pockets 27 of the turrets 26, the cans are tested for the omission and/or proper or improper location of the collar bands A. During this portion of the travel of the cans, they are retained in their turret pockets 27 by a curved guide rail 33 (Figs. 1 and 2) which extends adjacent the outer peripheries of the turrets 26 and which is secured to the main frame 24. Guide discs 34, 35 disposed on opposite sides of the turrets 26 and mounted on the main shaft 28 for rotation therewith retain the cans in their pockets against axial displacement. Testing of the cans during this travel is effected by collar detecting units 36 (to be hereinafter described) disposed in axial alignment with the turret pockets 27 and having members which are insertable into the open ends of the cans.

If a can B upon testing is found by its detecting unit 36 to be lacking a collar band A or is provided with an improperly located collar band, the insertable members of the detecting unit 36 are withdrawn from the can at an abnormal can release station H (Fig. 2) disposed adjacent the terminal end of the curved guide rail 33. This withdrawal of the detecting members releases the can, which is termed an abnormal can, and permits it to be picked up by a pair of spaced and parallel vertically disposed abnormal can transfer turrets 38 (Figs. 2 and 3) having spaced and transversely aligned pockets 39 in their outer peripheries for receiving and diverting the abnormal cans from their initial curved path of travel. A cylindrical permanent magnet 41 clamped in place between the transfer turrets 38 and rotatable with the turrets as a unitary structure attracts the abnormal cans to the transfer turrets and retains the cans in the turret pockets 39.

The transfer turrets 38 are mounted on a continuously rotating transfer shaft 42 which extends in spaced and parallel relation to the main shaft 28 and which is journaled at its ends in bearings 43 formed in the main frame 24. The shaft 42 is rotated in time with the main shaft 28 so that the pockets 39 of the transfer turrets 38 will mesh or register with the pockets 27 of the feeding turrets 26. For this purpose the turret shaft 42 carries a spur gear 45 (Fig. 3) which meshes with and is driven by a spur gear 46 which may be formed as an integral part of the main shaft driving sprocket 31.

Figure 3:
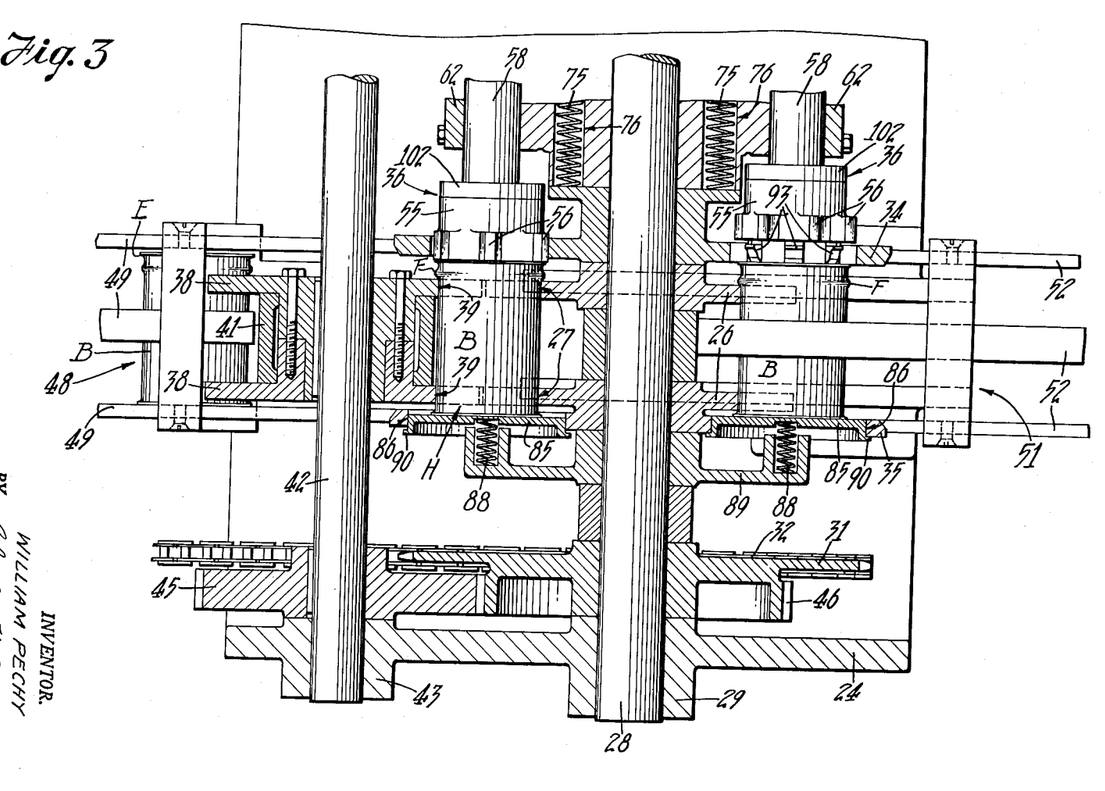
Fig. 3 is a top plan sectional view taken substanitally along the broken line 3—3 in Fig. 2, with parts broken away.

An abnormal can B picked up by the transfer turrets 38 is carried downwardly along a curved path of travel extending under the turrets and entering a slightly inclined abnormal can runway 48 (Figs. 2 and 3). This runway 48 is defined by a plurality of spaced and parallel top, bottom, and side guide rails 49 which are secured to the main frame 24. The top guide rail 49 extends into the space between the transfer turrets 38 and terminates closely adjacent the rotatable magnet 41 and serves as a stripper element for removing an abnormal can B from its transfer pockets 39 so that the released can will roll down the runway 48 to any suitable place of deposit for abnormal cans.

If a can B upon testing is found by its detecting unit 36 to contain a properly located collar band A, the insertable members of the detecting unit 36 are held in place within the can and thus as the can, termed a good can, passes through the abnormal can station H (Fig. 2), it is held in its feeding turret pockets 27 against the attraction of the rotating magnet 41 in the abnormal can transfer turrets 38. Hence the good can by-passes the transfer turrets 38 and the abnormal can runway 48 and continues its curved path of travel with the feeding turrets 26.

The feeding turrets 26 carry the good can downwardly under the turrets and enter the can into a slightly inclined good or normal can runway 51 (Figs. 2 and 3). This runway is defined by a plurality of spaced and parallel top, bottom, and side guide rails 52 which are secured to the main frame 24. When a good can is directly under the feeding turrets 26, the insertable members of the detecting units 36 are withdrawn from the can and this releases the can to the runway along which it rolls to any suitable place of deposit for good or normal cans. In this manner the good cans having properly located collar bands A are segregated from the abnormal cans having no collar bands or having improperly located collar bands, so that only the good cans will be filled and sealed for consumer use.

The detecting units 36 which are used to detect the abnormal cans will now be described and their function explained. There is one of these detecting units for each pocket unit 27 in the feeding turrets 26 and they are disposed in axial alignment with the pocket unit and travel with the feeding turrets around the axis of main shaft 28.

Each detecting unit 36 includes a hollow cylindrical chuck 55 (Figs. 1, 6 and 16) which is disposed adjacent the open end of a can B in the pockets 27 of the feeding turrets 26 and which chuck is disposed in axial alignment with each pocket unit. The chuck is formed on its outer periphery with a plurality of spaced chuck lugs 56 arranged for engagement against the flange E of the can B during the detecting operation. This engagement is brought about by a reciprocating movement of the chuck 55 toward the can B, the chuck being normally disposed in spaced relation to the open end of the can as shown in Fig. 1.

Figure 4:
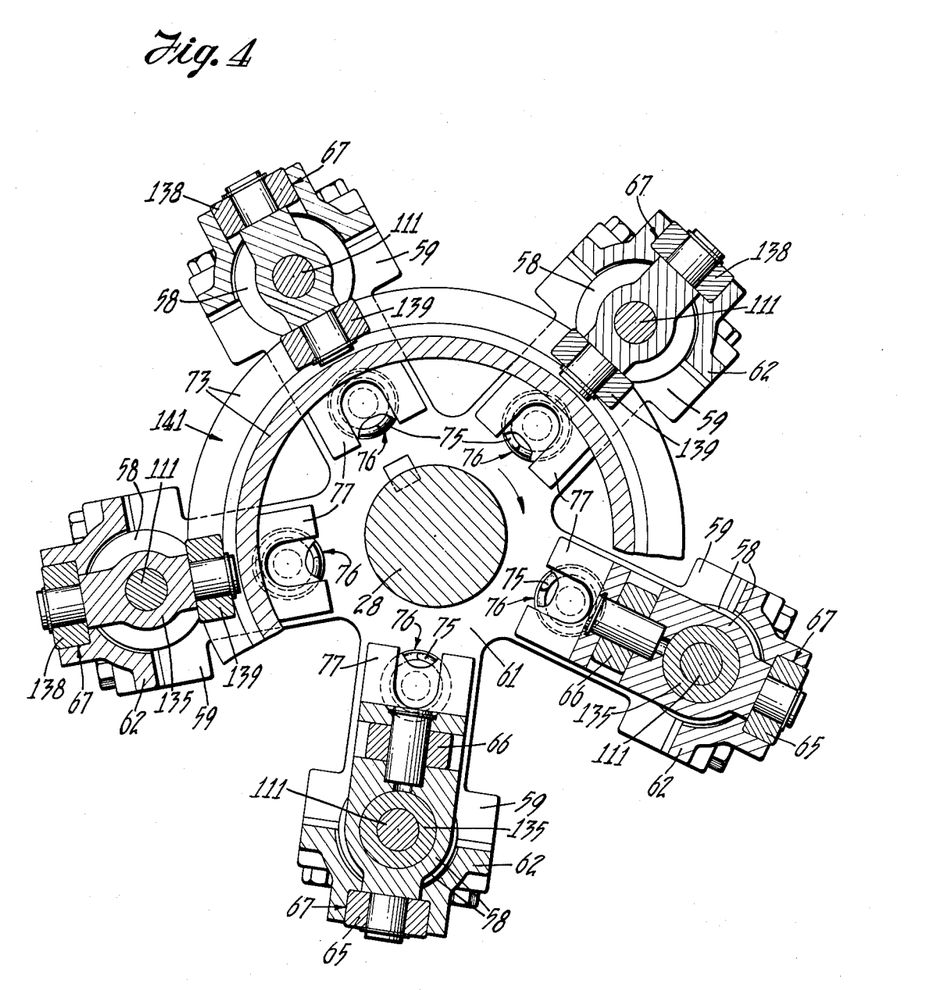
Figs. 4 and 5 are enlarged vertical sectional views taken substantially along the lines 4—4, 5—5 in Fig. 1.

For the purpose of reciprocating the chuck 55, it is attached to one end of an axially aligned actuating sleeve 58 slidably carried in a bearing 59 (see also Fig. 4) of a spider 61 mounted on and rotating with the main drive shaft 28. There is one of these sleeves for each chuck. The bearings 59 are provided with caps 62 (see also Fig. 5) which extend beyond the spider 61 and at their outer ends are secured to a supporting ring 63 (Fig. 5) which rotates with the spider. The end of the actuating sleeve 58 remote from the chuck 55 carries a pair of oppositely disposed rollers 65, 66.

Roller 65 is a guiding roller and operates in a longitudinal slot 67 formed in the overhanging portion of the bearing cap 62. This roller 65 retains the sleeve 58 against rotating or twisting in its bearing 59. The roller 66 is a cam roller and operates against an edge cam 71 having a projecting cam section 72 (Fig. 1) formed on the edge of a stationary hollow barrel cam 73 surrounding the main drive shaft 28 and secured in place on the main frame 24 (Fig. 1). Compression springs 75 housed in bores 76 in the spider 61 press against lugs 77 projecting from the actuating sleeve 58 and thus hold the cam rollers 66 against the edge cam 71.

Hence as the main shaft 28 rotates, it rotates the spider 61 together with the feeding turrets 26 and thus causes the cam rollers 66 to traverse the stationary circular edge cam 71. During this rotation, and immediately after a set of the pockets 27 of the feeding turrets 26 pass the lower end of the can entrance chute 21 (Fig. 2), the cam roller 66 on the adjacent chuck actuating sleeve 58, engages the cam projection 72 on the edge cam 71 and this slides the sleeve toward the can B picked up by the turret pockets (toward the left as viewed in Fig. 1).

During this sliding movement of the sleeve 58 toward the can B, the chuck 55 passes through a serrated opening 81 (Figs. 1, 6 and 10) in the guide disc 34. After the chuck 55 passes through this opening 81, the lugs 56 on the chuck engage against the flange E of the can and push the can slightly toward the left as viewed in Fig. 1 to insure proper engagement of the can flange with the chuck since the detecting of the proper location of the collar band A is effected in relation to the can flange.

In order to insure this proper contact of the can flange with the chuck, the can is pressed against a yieldable pad 85 which is disposed adjacent the closed or bottom end of the can B. There is one of these pads for each can, and they are seated in circular openings 86 (Fig. 6) formed in the auxiliary guide disc 35. Compression springs 88 interposed between the pads 85 and a collar 89 mounted on and rotating with the main shaft 28 press the pads inwardly toward the cans and provide for the yielding action above mentioned. A flange 90 on the outer edge of the pads 85 prevent the pads from being pushed through the openings 86 when there is no axial pressure on the cans.

With the flange E of the can B located in a predetermined position by the chuck 55, the detection of the omission and/or the proper location of the collar band A is effected while the can travels toward and before it reaches the station H hereinbefore mentioned. This detection of the collar band and its position is effected by a plurality of elongated rectangular detecting fingers or slide elements 93 (Figs. 1, 6, 7, 16) which are disposed in longitudinal slideways 94 (see also Fig. 10) formed in the interior of the chuck 55 and in aligned continuing slideways 95 (Fig. 16) formed in the outer edge of a head member 96 secured to the end of the chuck. The drawings show six of these detecting fingers 93 for each detecting chuck 55, the fingers being distributed equally around the head member 96 adjacent its outer periphery. The head member 96 is smaller in diameter than the inside diameter of the curled edge D of the collar band A to be detected and only a detecting lug 98 on each of the detecting fingers 93 projects radially beyond the outer periphery of the head member 96 for engagement with the curled edge D of the collar band for the detecting operation.

Within the chuck 55 compression springs 101 disposed in aligned bores formed in the ends of the detecting fingers 93 and in a flange 102 of the actuating sleeve 58, press the fingers outwardly from the chuck and provide for the yieldability of the fingers. Stop lugs 103 (Fig. 6) formed on the inner faces of the detecting fingers 93 engage against the inner face of the head member 96 and thus prevent the springs 101 from pushing the fingers outwardly too far.

Figures 11, 12:
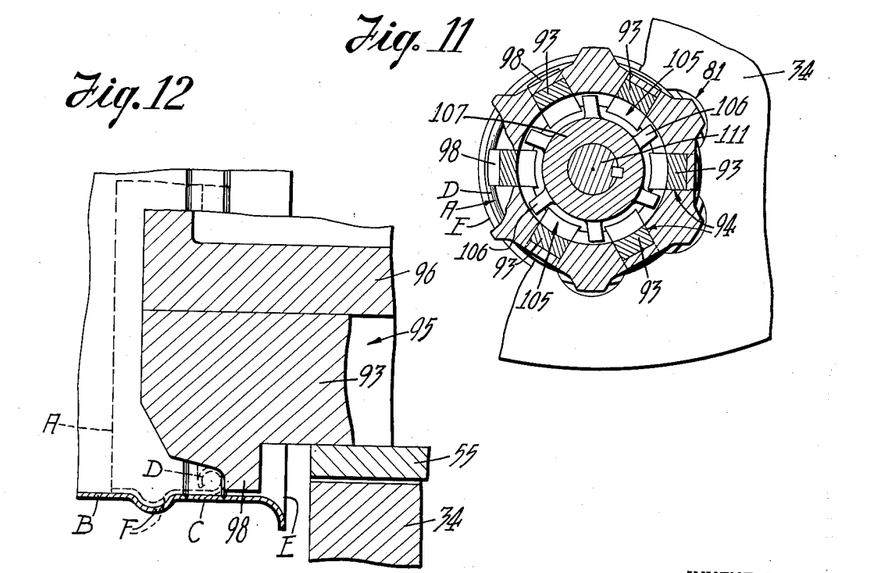
Fig. 12 is an enlarged schematic sectional view of a portion of the detecting unit in detecting position relative to a can in which its collar has been omitted or is improperly located too far into the can.
Figure 13:
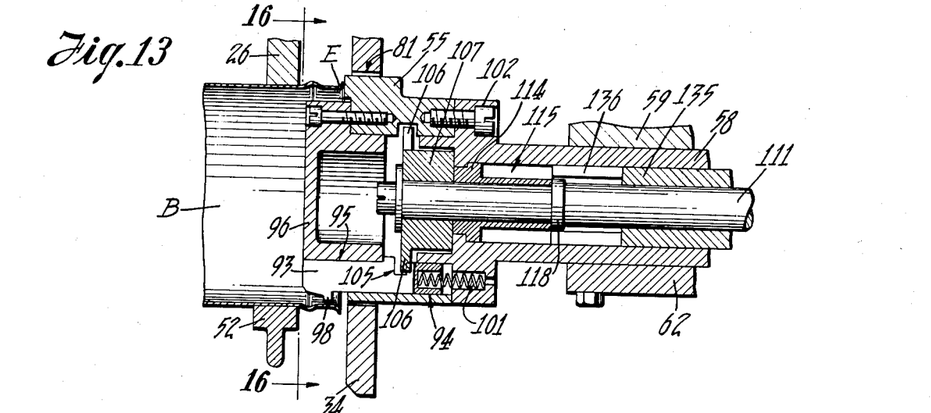
Fig. 13 is an enlarged sectional view similar to Fig. 6 and showing the relative positions of members of the detecting unit and a can for the abnormal collar condition illustrated in Fig. 12.

The stop lugs 103 are disposed in a predetermined spaced relation to the detecting lugs 98 so that in the normal position of the detecting fingers in the head member 96 the outer ends of the fingers are flush with the outer face of the head member as shown in Figs. 12 and 13. In this normal position of the detecting fingers, all of their stop lugs 103 are in a single vertical plane against the inner face of the head member 96 and also the detecting faces of all of the detecting lugs 98 are in another single vertical plane which is parallel to the plane of the stop lugs.

Hence when the chuck 55 moves into position against the flange E at the open end of a can B under the action of the edge cam 71 for a detecting operation, the head member 96 and the detecting fingers 93 move into the can with the chuck. If there is a collar band A in proper position in the can B, the detecting lugs 98 on the advancing detecting fingers 93 engage against the curled edge D of the collar band and thus the advancement of the fingers is arrested before the chuck 55 completes its movement. This stopping of the detecting fingers 93 in effect pushes them back into the chuck against the resistance of their springs 101 and thus when the chuck temporarily comes to rest against the flange E of the can, the fingers are in a predetermined relation to the chuck. For this condition of a can with a properly located collar band, the adjusted position of the detecting fingers 93 permit the locking of the chuck in its advanced position and thus temporarily prevents its movement through a return stroke to its original position. It is this locking feature that retains the head member 96 in place in the can and thus prevents release of the can at the station H as herebefore mentioned so that the can will be carried over into the good can discharge chute or runway 51.

The locking of the chuck 55 in its advanced position within the can is effected by a locking notch 105 (Fig. 6) formed in each of the detecting fingers 93 adjacent their stop lugs 103. For a good can the positioning of the detecting fingers 93 in the chuck 55 aligns their locking notches 105 with locking projections or lugs 106 (Figs. 6, 10 and 11) on a rotatable locking wheel or element 107 located within the chuck. The locking wheel 107 is formed with one locking lug 106 for each detecting finger 93 in the chuck and normally these locking lugs 106 are disposed in the spaces between the detecting fingers 93 as best shown in Fig. 11.

Figure 10:
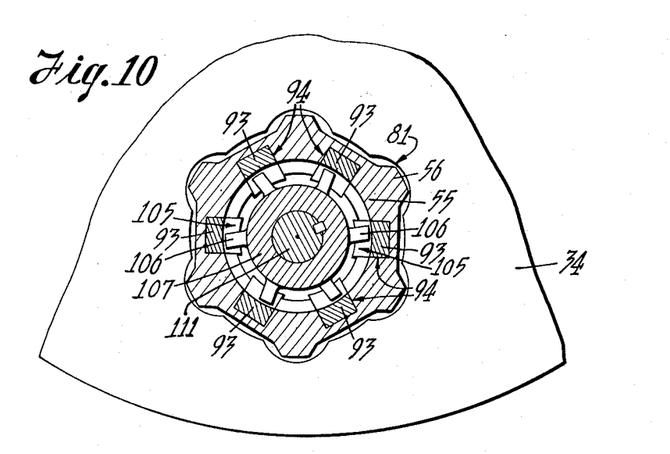
Figs. 10 and 11 are transverse sectional views taken substantially along the line 10—10 in Fig. 6, the two views showing certain of the movable parts of the detecting unit in different positions.

When the locking notches 105 in the detecting fingers 93 are all aligned with the locking lugs 106 on the locking wheel 107, the wheel can be rotated by cam action to cause the locking lugs to enter the locking notches as best shown in Fig. 10 and thereby effect the locking of the chuck 55 in its advanced position as will be hereinafter described. For this purpose the locking wheel 107 is fixedly mounted on a rocker shaft 111 (Figs. 1 and 6) which extends back through the chuck actuating sleeve 58 and projects beyond the sleeve, terminating adjacent the bearing cap support ring 63.

Adjacent the chuck 55, the rocker shaft 111 carries a locking collar 114 having in its outer periphery a plurality of spaced and parallel, longitudinally disposed spline grooves 115 (see also Figs. 8 and 9). The locking collar 114 is keyed to the rocker shaft 111 in abutting relation to the locking wheel 107 and is journaled for rotation with the rocker shaft in the chuck actuating sleeve 58 as a bearing. Between the abutting locking wheel and locking collar, the actuating sleeve 58 is formed with an inwardly projecting collar 117 (Fig. 6) which retains the rocker shaft 111 in place against longitudinal displacement relative to the actuating sleeve 58. A shoulder 118 on the rocker shaft 111 adjacent the grooved end of the locking collar 114 holds the latter against displacement along the shaft. Thus the locking wheel 107, the locking collar 114 and the rocker shaft 111 are united with the chuck actuating sleeve 58 and move with the sleeve to retain the locking wheel 107 in a predetermined position within the chuck 55.

Figure 5:
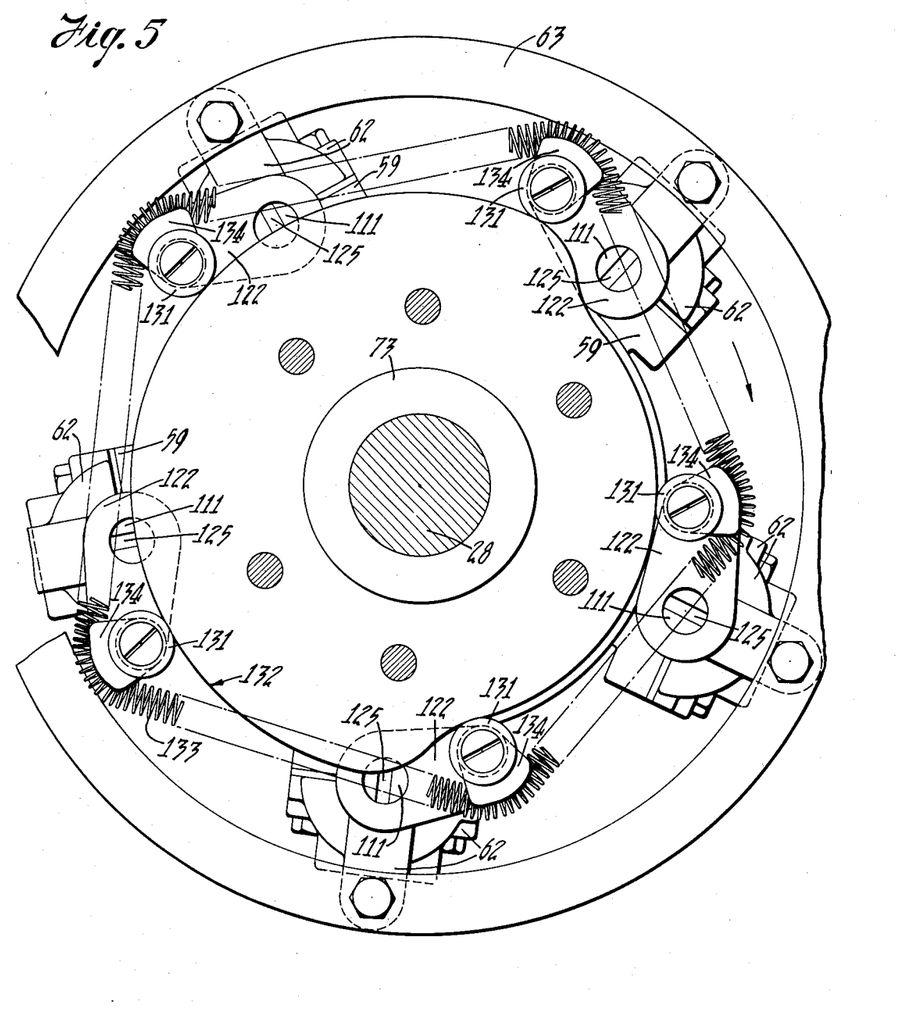
Figure 19:
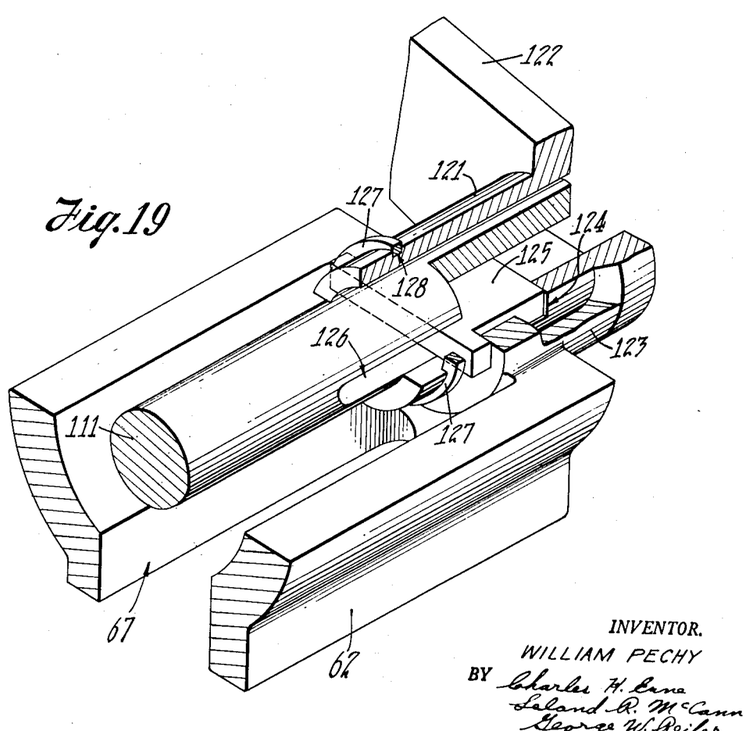
Fig. 19 is an enlarged perspective view of a portion of a detecting unit with parts broken away and shown in section.

The opposite end of the rocker shaft 111, i. e. the end adjacent the bearing cap support ring 63, is slidably disposed in a hub 121 (Figs. 1 and 19) of a cam arm 122 (see also Fig. 5). The hub 121 is carried for oscillation in a bearing 123 formed in the outer end of the bearing cap 62. In order to effect oscillation of the rocker shaft 111 with the cam arm hub 121, the hub is formed with a transverse slot 124 which carries a T-shaped key 125 which extends through a slot 126 in the end of the rocker shaft 111 (see Fig. 19). The key is held in the hub 121 and the hub is retained in its bearing 123 by a spring ring 127 engaged in an annular groove 128 in the hub 121. Thus the rocker shaft 111 can freely reciprocate in the hub 121 under actuation of the chuck sleeve 58 and simultaneously rotate with the hub under the oscillating action of the cam arm 122.

The outer end of the cam arm 122 carries a cam roller 131 (Figs. 1 and 5) which operates against an edge cam 132 formed on the stationary barrel cam 73. An endless, coiled wire spring 133 extends around the cam 132 and bears against curved seats 134 in the cam arms 122 for holding the cam rollers 131 of all of the cam arms against the edge cam 132. The edge cam 132 is shaped to oscillate the rocker shaft 111 in time with the reciprocation of the chuck sleeve 58 under the action of the edge cam 71 as will be hereafter explained.

Figure 14:
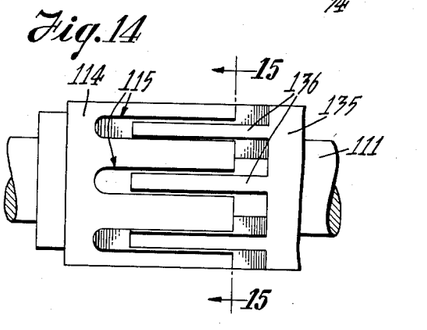
Fig. 14 is an enlarged elevational view similar to Fig. 8 and showing the relation of the splined and grooved members of the detecting unit for the abnormal collar condition illustrated in Fig. 12.
Figure 15:
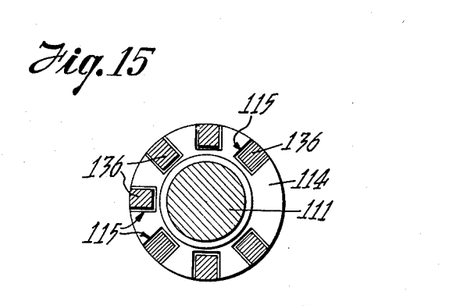
Fig. 15 is a transverse sectional view taken substantially along the line 15—15 in Fig. 14.

Between the cam arm 122 and the spline grooved collar 114, the rocker shaft 111 carries a splined sleeve 135 (Figs. 1, 6 and 8) which is reciprocable on the shaft. The end of the sleeve 135 nearest the chuck 55 is formed with a plurality of spaced and parallel, longitudinal splines or keys 136 which are slightly narrower than the width of the spline grooves 115 in the spline collar 114 as best shown in Fig. 14. The normal position of the splines 136 of the splined sleeve 135 is with their terminal ends in abutting relation to the adjacent end of the grooved collar 114 as shown in Figs. 6 and 8. Collar 114 is rotatable relative to sleeve 135 to place their respective splines 136 and grooves 115 in aligned and meshing relation as shown in Figs. 14 and 15.

The opposite end of the splined sleeve 135 carries a guide roller 138 (Fig. 1) which operates in the guide slot 67 of the bearing cap 62 to maintain the splined sleeve against rotation with and on the rocker shaft 111. Opposite this guide roller, the sleeve carries a cam roller 139 which operates in a cam groove 141 (Fig. 1) in the barrel cam 73. For a portion of its extent the cam groove 141 has a peak section 142 which follows the raised or peak section 72 of the edge cam 71 but continues along a straight line path for a greater extent than the raised portion 72 as will be hereinafter explained.

In operation, at the beginning of a collar band detecting step, the splined sleeve 135 moves toward the can B with and at the same speed of travel as the chuck sleeve 58, the spline grooves 115 in the collar 114 remaining in their normal relation to the splines 136 in the sleeve as mentioned above, during this travel. Also as mentioned above for a good can, i. e. a can having a properly located collar band A (as best shown in Fig. 7) the detecting fingers 93 in engagement with the curled edge D of the collar band locate the locking notches 105 in alignment with the locking lugs 106 on the rotatable locking wheel 107 (as shown in Fig. 6).

As soon as this detecting step has been effected and while the chuck sleeve cam roller 66 is on the peak section 72 of the edge cam 71, before the cam reaches the station H, the edge cam 132 rocks the cam arm 122 inwardly and this partially turns the rocker shaft 111 and the locking wheel 107, the alignment of the locking notches 105 and the locking lugs 106 permitting this turning movement. This turning of the rocker shaft 111 also turns the splined collar 114 relative to the splined sleeve 135 and thus shifts the spline grooves 115 in the collar out of alignment with the splines 136 in sleeve 135 as shown in Figs. 8 and 9.

Thus at the end of the peak section 72 of the edge cam 71, when the chuck sleeve 58 attempts to return to its original position to withdraw the chuck 55 and head member 96 from the can, the out of line spline grooves 115 in the collar 114 and the splines 136 of the splined sleeve 135, block the return movement of the chuck sleeve 58 and thus hold the chuck and the head member in the can. The cam roller 66 on the chuck sleeve 58 thus rides off the peak section 72 of the edge cam 71 into space and is temporarily held in spaced relation to its cam 71. In this manner the cam roller 139 of the splined sleeve 135 while riding in the peak section 142 of the cam groove 141 holds the chuck sleeve 58 and the properly collared can B in place until they have passed the station H.

After the can passes the station H and has entered the good can discharge runway 51, the cam roller 139 on the splined sleeve 135 shifts from the peak section 142 to the continuing section 141 of the barrel cam groove and thus returns the splined sleeve 135 and the chuck sleeve 58 to their original positions. This withdraws the chuck 55 and the head member 96 from the can and thus releases the can to the good can discharge runway 51.

During this release of the can, the edge cam 132 swings the cam arm 122 outwardly (as viewed in Fig. 5) and thus rocks the locking wheel 107 back into its original position with its locking lugs 106 disposed in the spaces between the detecting fingers 93 as shown in Fig. 11. This releases the detecting fingers and they return to their normal positions for a subsequent detecting action.

If the collar band A is missing from a can, or if there is a collar band but it is inserted too far into the can, or if the collar is in backwards, i. e. with the curled edge D inwardly of the bead F, so as to bring about an abnormal can condition as represented in Fig. 12, the detecting fingers 93 will not be pushed back into the chuck 55 as they are for a good can, when the chuck and the head member 96 are inserted into the open end of the can as explained above. Hence the locking notches 105 in the detecting fingers 93 will not align with the locking lugs 106 on the locking wheel 107 as best shown in Fig. 13.

Thus when the edge cam 132 attempts to rock the rocker shaft 111 and the locking wheel 107, the locking lugs 106 engage against the sides of the detecting fingers 93 and thus prevent oscillation of the locking wheel. Hence the cam rollers 131 on the cam arms 122 ride out into space away from the edge cam 132. This failure of the locking wheel 107 to rotate holds the spline grooved collar 114 against rotation and thus retains the spline grooves 115 in their normal alignment with the splines 136 on the splined sleeve 135.

Accordingly when the chuck sleeve cam roller 66 rides off the peak section 72 of the edge cam 71, the aligned spline grooves 115 and splines 136 permit the chuck sleeve 58 to move away from the can while the splined sleeve 135 remains in its advanced position, the spline grooves and splines meshing or sliding into each other as shown in Fig. 14. This action permits the chuck 55, detecting fingers 93 and head member 96 to be withdrawn from the can and to thereby release their support of the can. The terminal end of the peak section 72 of the edge cam 71 is located to effect full release of the abnormal can at the station H so that the magnet 41 in the transfer turrets 38 can take over the attraction or support of the can and carry it to the abnormal can discharge chute 48.

Figures 16, 17:
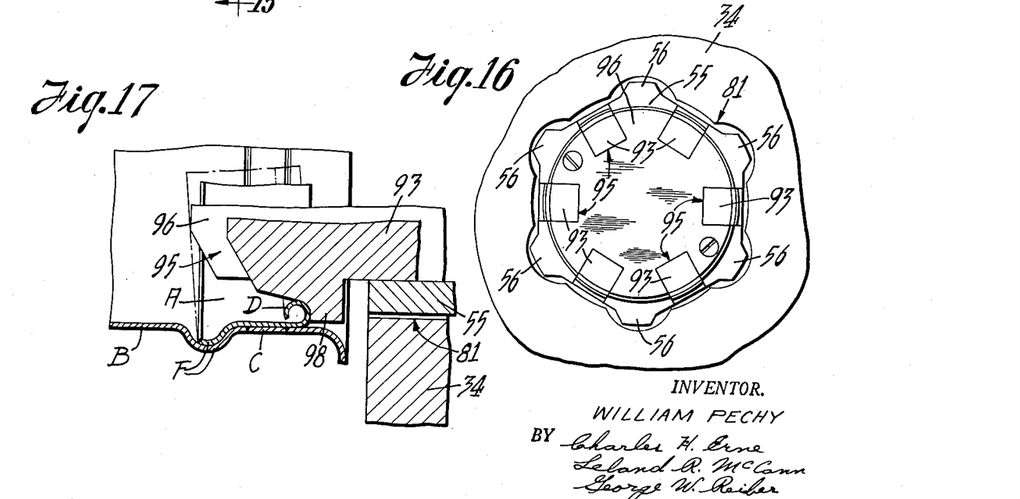
Fig. 16 is an enlarged sectional view taken substantially along the line 16—16 in Fig. 13, with the can omitted and with parts broken away.
Fig. 17 is an enlarged schematic sectional view of a portion of the detecting unit in detecting position relative to a can in which its collar is located too far out or is located at an angle in the can.
Figure 18:
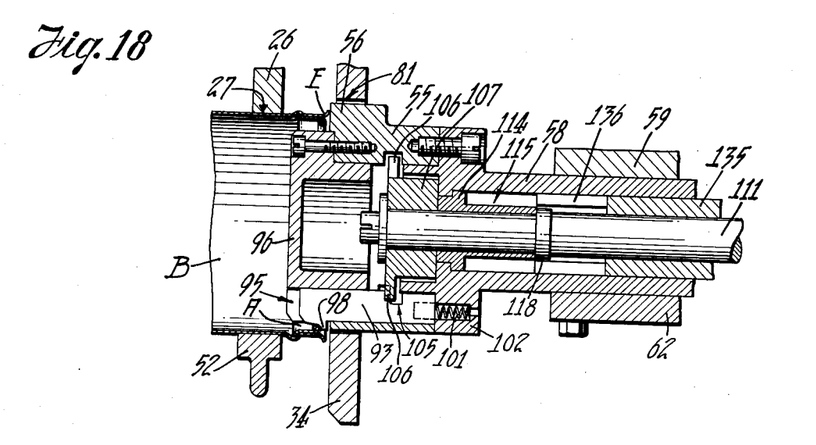
Fig. 18 is an enlarged sectional view similar to Figs. 6 and 13 and showing the relative positions of members of the detecting unit and a can for the abnormal collar condition illustrated in Fig. 17.

In a similar manner, if the collar band A is not inserted into the can far enough or if it is tilted or on an angle in the can, as represented in Fig. 17, one or more of the detecting fingers 93, depending upon the degree of insertion or tilting of the collar band, will be pushed too far back into the chuck 55 when the chuck and the head member 96 are inserted into the open end of the can. This condition also locates the locking notches 105 of the detecting fingers 93 out of alignment with the locking lugs 106 on the locking wheel 107 as shown in Fig. 18. In any case where any one of the locking notches 105 is out of alignment with the locking lugs 106 the locking wheel 107 cannot be rotated. This is particularly useful when a collar band is disposed at an angle. Hence the resulting action of the chuck sleeve movement relative to the splined sleeve movement is the same as explained immediately above for the omission of a collar band and hence the abnormal can is released at the station H for support by the magnet 41 and transfer to the abnormal can discharge chute 48.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for detecting collar bands in tearing strip cans and for separating normal cans having a properly located collar band from abnormal cans lacking a collar band or having an improperly located collar band, the combination of a feeding turret having peripheral pockets for receiving and propelling cans to be tested along a predetermined curved path of travel to and through an abnormal release station, a detector head disposed in axial alignment with each of said turret pockets and projectable into the cans in said pockets for detecting the presence and location of collar bands in said cans, means for projecting said detector heads partially into said cans for supporting them during said detecting operation, means for retracting said heads from said cans to release them at said abnormal can station, a transfer turret disposed adjacent said can feeding turret at said abnormal can station and having peripheral pockets for receiving abnormal cans released from said feeding turret, means for rotating said turrets in unison, magnet means in said transfer turret for attracting and holding said received abnormal cans in said turret pockets, and locking means carried by said heads for holding the heads in their projected can supporting position within normal cans to prevent the release of said normal cans from said feeding turret pockets at said abnormal can station, thereby separating the normal cans from the abnormal cans.

2. In a machine for detecting collar bands in tearing strip cans and for sorting normal cans each having a properly located collar band from abnormal cans each lacking a collar band or having an improperly located collar band therein, the combination of means for propelling a can to be tested along a predetermined path of travel through an abnormal can release station, a detector head comprising a chuck engageable with a flange on a can, a head member insertable within said can, and a yieldable detecting finger carried by said head member and extending into said chuck and engageable against a collar band in said can for detecting the location of said band, means for moving said detector head toward said can for engaging and supporting it during a detecting operation, said moving means being further operative to move said detector head away from said can for releasing an abnormal can at said station, and locking means carried by said head, said locking means being responsive to and controlled by the position of said detecting finger for permitting withdrawal of said head from supporting position in respect to abnormal cans to release the latter at said station and for holding said head in supporting position within normal cans to prevent the release of said normal cans at said abnormal can station, thereby separating the normal cans from the abnormal cans.

3. In a machine for detecting collar bands in tearing strip cans and for sorting normal cans each having a properly located collar band from abnormal cans each lacking a collar band or having an improperly located collar band, the combination of means for propelling a can to be tested along a predetermined path of travel through an abnormal can release station, a detector head comprising a chuck engageable with a flange on a can, a head member insertable within said can, and a plurality of movable detecting fingers yieldably carried by said head member and extending into said chuck, at least one of said inserted fingers being engageable against a collar band in said can for detecting the presence and location of said band, means for moving said detector head toward said can for engaging and supporting it during a detecting operation and away from said can for releasing it at said station, and movable locking means carried by said head, said locking means being movably responsive to and controlled by a predetermined position of one of said detecting fingers into a position to permit withdrawal of said head member from supporting engagement with abnormal cans to release them at said station, said locking means being controlled by a predetermined position of all of said movable detecting fingers to a position for holding said head member in supporting position within normal cans to prevent release thereof at said station, thereby separating the normal cans from the abnormal cans during advancement thereof by said propelling means.

4. In a machine for detecting collar bands in tearing strip cans and for sorting normal cans each having a properly located collar band from abnormal cans each lacking a collar band or having an improperly located collar band, the combination of means for propelling a can to be tested along a predetermined path of travel through an abnormal can release station, a detector head comprising a chuck engageable with a flange on a can, a head member insertable within said can, and a yieldable detecting finger carried in said head member and extending into said chuck, said finger having a detecting lug engageable against a collar band in said can for detecting the location of said collar band, said detecting finger within said chuck having a locking notch disposed a predetermined distance from said detecting lug, means for moving said detector head toward said can for supporting it during a detecting operation and away from said can for releasing it at said station, a locking wheel within said chuck, said wheel having a locking lug disposed adjacent said detecting finger and out of line with its locking notch, means for rotating said locking wheel when a normal can aligns the locking notch of said detecting finger with the locking lug of said wheel, and a locking device partially connected with said locking wheel and effective upon rotation of said wheel to hold said detecting head in supporting position in normal cans to delay the release of said normal cans beyond said abnormal can station to separate the normal cans from the abnormal cans.

5. In a machine for detecting collar bands in tearing strip cans and for sorting normal cans having properly located collar bands from abnormal cans lacking such collar bands or having improperly located collar bands, the combination of means for propelling a can to be tested along a predetermined path of travel through an abnormal can station, a detector head comprising a chuck engageable with a flange on a can, a head member insertable within said can, and a yieldable detecting finger carried in said head member and extending into said chuck and engageable against a collar band in said can for detecting the location of said collar band, said detecting finger within said chuck having a locking notch movable with said finger into a predetermined position in said chuck when a normal can is detected, means for moving said detector head toward said can for supporting it during a detecting operation and away from said can for releasing it at said abnormal can station, a locking wheel within said chuck, said wheel having a locking lug disposed adjacent said detecting finger and out of line with its locking notch, means for rotating said locking wheel when a normal can aligns the locking notch of said detecting finger with the locking lug of said wheel, a relatively stationary splined locking member disposed adjacent said detecting head, and a grooved locking member interposed between said locking wheel and said splined member in longitudinal alignment for interengagement when said head moves away from a can for releasing it at said abnormal can station, said grooved member being connected with said locking wheel for rotation therewith for rotating said grooved member out of alignment with said splined member to hold said detecting head in supporting position in normal cans to delay the release of said normal cans beyond said abnormal can station to separate the normal cans from the abnormal cans.

6. In a machine for detecting collar bands in tearing strip cans and for sorting normal cans each having a properly located collar band from abnormal cans each lacking a collar band or having an improperly located collar band, the combination of means for propelling a can to be tested along a predetermined path of travel through an abnormal can station, a detector head insertable into said moving can for detecting the location of a collar band in said can, detecting means carried in said head and engageable with a collar band in said can and movable by a properly located collar band in a normal can into a predetermined position in said head, head cam means having an actuating cam section of a predetermined length for moving said head partially into said can for supporting it during said detecting operation and away from said can for releasing an abnormal can at said station, a splined locking member disposed in axial alignment with said head, locking cam means having an actuating cam section partially parallel with the cam section of said head cam means for moving said splined locking member toward said can in unison with said head, said locking cam section being longer than said head cam section for retaining said splined locking member in its advanced position beyond said abnormal can station, a splined grooved locking member adjacent said head in axial alignment with said splined locking member with the splines and the grooves of said locking members in longitudinal alignment for meshing interengagement during the release of an abnormal can at said station, a rotatable locking element disposed in said head adjacent the detecting means located therein and connected to said splined grooved locking member, and cam means for rotating said locking element only when a normal can moves said detecting means into its predetermined position for rotating said splined grooved locking member out of alignment with said splined locking member to transfer withdrawal of said head from said head cam means to said locking cam means to hold said detector head in supporting position in normal cans to delay the release of said normal cans beyond said abnormal can station to separate the normal cans from the abnormal cans.

7. In a machine for detecting collar bands in tearing strip cans and for separating normal cans having a properly located collar band from abnormal cans lacking a collar band or having an improperly located collar band, the combination of means for propelling a can to be tested along a predetermined path of travel to and through an abnormal can release station, a movable detector head projectable into said moving can for detecting the presence and location of a collar band in said can, means for projecting said detector head partially into said can for supporting it during said detecting operation and for retracting said head from a said abnormal can for releasing it at said abnormal can station, rotatable locking means carried by said head, and means responsive to the presence of a properly positioned collar in said can for rotating said locking means into locking engagement with said head for holding said head in projected can supporting position within normal cans to prevent the release of said normal cans at said abnormal can station, thereby to separate normal cans from abnormal cans.

8. In a machine for detecting collar bands in tearing strip cans and for separating normal cans having a properly located collar band from abnormal cans lacking a collar band or having an improperly located collar band, the combination of means for propelling a can to be tested along a predetermined path of travel to and through an abnormal can releasing station, a movable detector head projectable into said moving can for detecting the presence and location of a collar band in said can, means for projecting said detector head partially into said can for supporting it during said detecting operation and for retracting said head from a said abnormal can for releasing it at said abnormal can station, means at said station for diverting a released abnormal can from said path of travel, rotatable locking means carried by said head, and means responsive to the presence of a properly positioned collar in said can for rotating said locking means into locking engagement with said head for holding the projected head in can supporting position within normal cans to prevent the release of said normal cans at said abnormal can station, thereby maintaining said normal cans in said path of travel to separate normal cans from abnormal cans.

References Cited in the file of this patent

UNITED STATES PATENTS

| | | |
|---|---|---|
| 1,266,666 | Dillon | May 21, 1918 |
| 1,916,260 | Geersten | July 4, 1933 |
| 2,014,706 | Sullivan | Sept. 17, 1935 |
| 2,224,204 | Wassen | Dec. 10, 1940 |
| 2,332,525 | Peck | Oct. 26, 1943 |
| 2,353,758 | Peck | July 18, 1944 |
| 2,649,961 | Reynolds | Aug. 25, 1953 |
| 2,696,296 | Simpson et al. | Dec. 7, 1954 |